Patented Sept. 5, 1933

1,925,192

UNITED STATES PATENT OFFICE 1,925,192

PROCESS FOR THE PRODUCTION OF ARTIFICIAL SILK FROM VISCOSE

Theodoor Koch, Arnhem, Netherlands, assignor, by mesne assignments, to American Enka Corporation, Wilmington, Del., a corporation of Delaware No Drawing. Application March 5, 1931, Serial No. 520,482, and in the Netherlands March 8, 1930

4 Claims. (Cl. 106—40)

The invention relates to a method of producing artificial silk from viscose.

As is known, viscose which is prepared from sulphite cellulose, is not a clear transparent solution. Probably the reason for this lies mainly in the fact that the resin-like substances, ordinarily available are only in part hydrolyzed and rendered soluble in the treatment with alkali, to which cellulose is subjected in the production of viscose. A large portion remains in the viscose in the form of a very fine suspension, and cannot be removed by the usual methods of filtration.

In order to purify a turbid viscose of this kind, it has already been proposed to treat it with solvents of organic nature. The process is inconvenient and requires an expensive apparatus.

It has been found that also by colloid-chemical means the fine suspension present in the viscose can be peptized to such an extent that a completely clear spinning solution is obtained.

To obtain this result the viscose according to the invention, at any desired stage of preparation has added to it a small amount of a sulphonated fatty acid or sulphonated fat with a degree of sulphonation of 100%, preferably in an amount of less than 2%, calculated on the viscose. In every case the quantity of free fatty acid not yet sulphonated or non-sulphonated fat present if any, in the sulphonated product must be so small, that the product gives no turbidity with an excess of lye.

Furthermore, it has been found according to the invention, that an addition of small amounts of alkylated aromatic sulphonic acid increases the effect of the first-mentioned additions.

It is already known to add to the viscose large quantities of sulphonated oil, in order favourably to affect the coagulation and obtain a more uniform colouring. However, owing to the high concentration of lye present in the viscose, these substances are flocculated, so that no clear viscose is obtained, but an even more turbid viscose. There is no indication as regards the sulphonation degree of these products.

To carry out the new process use is made however of fats or fatty acids with a high percentage of organically bound sulphuric acid, viz. such that the degree of sulphonation is 100%.

In the specification and claims, degree of sulphonation of sulphonated fats and fatty acids is understood as meaning the ratio between the number of fatty acid radicals, bound to sulphuric acid and the total number of fatty acid radicals present.

The fatty acids which come into consideration are mono or polybasic fatty acids with one or more hydroxyl groups and/or double bonds.

It may be mentioned that the definition given above for degree of sulphonation differs from the definition which has been given by Dr. A. Landolt in "Melliands Textilberichten" IX, 1928, page 759 et seq.

A sulphonated fatty acid or a sulphonated fat with a sulphonation degree of 93% according to Landolt has a sulphonation degree of 100% according to the above definition.

It is also emphasized that only in the last few years has it been possible to prepare sulphonated fats and fatty acids with a sulphonation degree of 100% according to the new definition.

In the sulphonation of a hydroxy fatty acid, the hydrogen atom of the hydroxyl group is replaced by the group SO$_3$H, so that for instance from a hydroxy acid of the general formula

a sulphonated product is formed having the general formula

In the reaction, finally, small amounts of products of the general formula

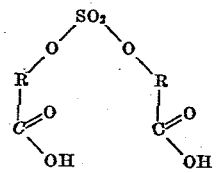

may be formed.

These substances also have a sulphonation degree of 100% according to the above-mentioned definition.

It is necessary for the non-sulphonated fat or non-sulphonated fatty acid to be removed as completely as possible, since otherwise when these substances are added to the viscose flocculations occur again. The liberated glycerine may be removed, but this is not absolutely necessary.

The preparation of the new added substances is effected by sulphonation with an excess of sulphuric acid in the presence of acid chlorides, acid anhydrides etc. The amount of sulphonated fats added to the viscose is only very small and amounts to less than 2%. It is even possible to produce a perfectly clear solution with much smaller quantities, for instance 0.05%.

As example of a substance, which is preferably used according to the invention, mention may be made of the "Praestabitoel" sold by the firm Stockhausen of Krefeld, which according to Dr. A. Landolt (Melliands Textilberichte 1928, page 760) is a sulphoricinate with a sulphonation degree of 93% according to Landolt.

As already stated, the effect of the highly sulphonated oils can be increased by the addition of small amounts of alkylated aromatic sulphonic acids, for instance iso-butyl-naphthalene-sulphonic acid.

The addition can take place in any stage of the process of production, for instance during preparation of the sodium cellulose or during dissolving of the viscose; for instance the highly sulphonated fatty acid may be added to the carbon disulphide to be used for xanthogenation.

It is also pointed out that the addition of the new sulphonation products also favourably influences the spinning capacity of the viscose. A viscose, which contains the new additions, gives strong, smooth, lustrous threads at stages of ripeness at which otherwise a perfectly useless, dull, brittle thread is obtained. This is a further and technically very important advantage of the new process, because the range of ripeness within which the viscose can be worked up, is thus considerably extended.

What I claim is:

1. A process for the production of artificial silk from viscose, consisting in adding small amounts, viz. less than 2%, calculated on the viscose, of a sulphonated fatty acid with a sulphonation degree of 100% to the viscose at any stage of preparation, the amount of non-sulphonated free fatty acid or non-sulphonated fat which may be present in the highly sulphonated product being so small that the viscose shows no turbidity with an excess of lye.

2. A process for the production of artificial silk from viscose, consisting in adding small amounts, viz. less than 2% calculated on the viscose, of a suphonated fat with a sulphonation degree of 100% to the viscose at any stage of preparation, the amount of non-sulphonated free fatty acid or non-sulphonated fat which may be present in the highly sulphonated product being so small that the viscose shows no turbidity with an excess of lye.

3. A process for the production of artificial silk from viscose, consisting in adding small amounts, viz. less than 2% calculated on the viscose, of a sulphonated fatty acid with a sulphonation degree of 100%, together with small amounts of iso-bultyl-naphthalene-sulphonic acid, to the viscose at any stage of preparation, the amount of non-sulphonated free fatty acid or non-sulphonated fat which may be present in the highly sulphonated product being so small that the viscose shows no turbidity with an excess of lye.

4. A process for the production of artificial silk from viscose, consisting in adding small amounts, viz. less than 2%, calculated on the viscose, of a sulphonated fat with a sulphonation degree of 100%, together with small amounts of iso-butyl-naphthalene-sulphonic acid, to the viscose at any stage of preparation, the amount of non-sulphonated free fatty acid or non-sulphonated fat which may be present in the highly sulphonated product being so small that the viscose shows no turbidity with an excess of lye.

THEODOOR KOCH.